(12) United States Patent
Scanlon et al.

(10) Patent No.: US 9,535,919 B2
(45) Date of Patent: Jan. 3, 2017

(54) METHOD AND APPARATUS FOR SELECTIVELY DELETING CACHED RECORDS

(71) Applicant: McKesson Financial Holdings, Hamilton (BM)

(72) Inventors: Ryan Scanlon, Enfield, CT (US); Steve Locke, Amherst, MA (US)

(73) Assignee: McKesson Financial Holdings, Hamilton (BM)

( * ) Notice: Subject to any disclaimer, the term of this patent is extended or adjusted under 35 U.S.C. 154(b) by 141 days.

(21) Appl. No.: 13/836,318

(22) Filed: Mar. 15, 2013

(65) Prior Publication Data
US 2014/0279854 A1   Sep. 18, 2014

(51) Int. Cl.
*G06F 17/30* (2006.01)
(52) U.S. Cl.
CPC ... *G06F 17/30117* (2013.01); *G06F 17/30132* (2013.01)
(58) Field of Classification Search
CPC .......... G06F 17/30905; G06F 17/30867; G06F 17/30442; G06F 17/30457
See application file for complete search history.

(56) References Cited

U.S. PATENT DOCUMENTS

| | | | |
|---|---|---|---|
| 6,397,228 B1* | 5/2002 | Lamburt | G06F 17/30371 200/201 |
| 7,647,365 B2* | 1/2010 | Horvitz et al. | 707/813 |
| 7,984,073 B1* | 7/2011 | Basiago | G06F 17/30312 707/802 |
| 2002/0112083 A1* | 8/2002 | Joshi et al. | 709/248 |
| 2005/0193414 A1* | 9/2005 | Horvitz | H04N 21/482 725/46 |
| 2006/0053164 A1* | 3/2006 | Ewing | G06F 17/30306 |
| 2009/0019091 A1* | 1/2009 | Horvitz et al. | 707/201 |
| 2009/0138487 A1* | 5/2009 | Ewing | G06F 17/30306 |
| 2009/0157974 A1* | 6/2009 | Lasser | 711/135 |
| 2011/0087956 A1* | 4/2011 | Sherman | G09B 5/00 715/233 |

(Continued)

OTHER PUBLICATIONS

Low, G., *Plan Caching in SQL Server 2008*, [online][retrieved Jun. 12, 2013] Retrieved from: <URL: http://msdn.microsoft.com/en-us/library/ee343986(v=SQL.100).aspx > Published Aug. 2009. 52 pages.

(Continued)

*Primary Examiner* — Angelica Ruiz
(74) *Attorney, Agent, or Firm* — Alston & Bird LLP

(57) ABSTRACT

A method, apparatus and computer program product selectively delete records from a cache in a manner that not only takes into account usage of the record, but also the cost associated with the generation of the record. In regards to a method, a cost associated with generation of a record maintained in a cache is determined. The cost may be defined in terms of the time consumed to generate the record. The method also determines usage of the record. At least one of the cost or the usage may be determined on a relative basis with respect to the cost or the usage, respectively, of other records maintained in the cache. Further, the method determines whether the record should be deleted from the cache based upon the cost and the usage of the record. Based on this determination, the record may be selectively deleted from or retained within the cache.

21 Claims, 2 Drawing Sheets

(56) References Cited

U.S. PATENT DOCUMENTS

2012/0150830 A1* 6/2012 Miyoshi ............ G06F 17/30442
707/705

OTHER PUBLICATIONS

Marathe, A., *Batch Compilation, Recompilation, and Plan Caching Issues in SQL Server 2005*, [online][retrieved Jun. 19, 2013] Retrieved from: <URL: http://technet.microsoft.com/en-us/library/Cc966425(d=printer) > Published Jul. 2004. 36 pages.

*Output Caching in an Action Method*, [online][retrieved Jun. 12, 2013] Retrieved from: <URL: http://msdn.microsoft.com/en-us/library/dd410202(v=VS.90).aspx >.

\* cited by examiner

METHOD AND APPARATUS FOR SELECTIVELY DELETING CACHED RECORDS

TECHNOLOGICAL FIELD

An example embodiment of the present invention relates generally to cached records, such as cached database search results, and, more particularly, to the selective deletion of cached records.

BACKGROUND

Databases frequently store large quantities of data in an organized fashion. Although databases may store a wide variety of different types of data, one example of a database that stores a substantial quantity of data may be a database that stores medical records. A database may be queried in order to identify data stored within the database or information regarding the data stored by the database. As such, a database query may return database search results responsive to the query. In this regard, in response to receipt of a database query, the database is reviewed and data or other information that is responsive to the database query may be provided. The process of responding to a database query therefore consumes processing time and processing resources.

To avoid unnecessarily expending processing time and processing resources in an instance in which a database query is repeated, particularly in an instance in which the database has not been updated since the same database query was previously processed, records may be maintained of the database search results. As such, in instances in which the same database query is repeated, the record that includes the database search results for the prior database query may be provided in a more timely and efficient manner without having to again consume the processing time and processing resources that would otherwise be required to review the database in response to the same database query.

The records of the database search results may be maintained in memory, such as a cache. Because a database may be repeatedly queried and/or because the database search results for database queries may be sizable, the records stored by the cache and, as a result, the size of the cache may become larger than is desired. In some instances, the cache may become so large that the performance of the cache is adversely impacted. As such, techniques have been developed in order to delete records from the cache in an instance in which the cache exceeds a predefined size. In this regard, in an instance in which the cache exceeds the predefined size, records may be deleted in accordance with a least recently used (LRU) technique in which the least recently used records are initially deleted, a least frequently used (LFU) technique in which the least frequently used records are initially deleted or an adaptive replacement cache (ARC) technique. In each of these techniques, the records are deleted until the cache is within the bounds established by the predefined size.

BRIEF SUMMARY

A method, apparatus and computer program product are provided in accordance with an example embodiment of the present invention in order to selectively delete records from a cache in a manner that not only takes into account usage of the record, but also the cost associated with the generation of the record. As such, the method, apparatus and computer program product of an example embodiment may preferentially retain records having a greater cost associated with their generation in comparison to other records having a smaller cost associated with their generation. By retaining those records that have a greater cost associated with their generation for a longer period of time, the method, apparatus and computer program product of an example embodiment may avoid incurring those greater costs in conjunction with the subsequent generation of a response to the same database query. Additionally, the method, apparatus and computer program product of an example embodiment may selectively delete records from a cache without requiring the cache to have a predefined size, that is, without requiring the cache to have a hard limitation upon its size.

In one embodiment, a method is provided that includes determining a cost associated with generation of a record maintained in a cache, such as in terms of the time consumed to generate the record. The method also determines usage of the record. At least one of the cost or the usage is determined on a relative basis with respect to the cost or the usage, respectively, of other records maintained in the cache. Further, the method determines, with a processor, whether the record should be deleted from the cache based upon the cost and the usage of the record and, in one embodiment, without consideration of a size of the cache.

The method of one embodiment may also determine a cost ratio of the cost associated with generation of the record and an average cost associated with the generation of other records maintained in the cache. In this embodiment, the method may determine whether the record should be deleted based upon the cost ratio. The method of this embodiment may also include combining the cost ratio with a representation of the usage of the record to define a score. As such, the method of this embodiment may determine whether the record should be deleted by comparing a combination of the cost ratio and the representation of the usage of the record with a predefined threshold. In regards to combining the cost ratio with the representation of the usage of the record, the method may individually weight the cost ratio and the representation of the usage of the record to define a score. The method may determine the usage of the record in various manners including by determining an average number of retrievals of the record in a predefined time period since a most recent refresh of the records or by determining a representation of time remaining prior to expiration of the of the record.

In another embodiment, an apparatus is provided that includes processing circuitry configured to determine a cost associated with generation of a record maintained in a cache, such as in terms of time consumed to generate the record. The processing circuitry may also be configured to determine usage of the record. The processing circuitry may be further configured to determine whether the record should be deleted from the cache based upon the cost and the usage of the record and, in one embodiment, without consideration of a size of the cache. The processing circuitry may be configured to determine at least one of the cost or the usage on a relative basis with respect to the cost or the usage, respectively, of other records maintained in the cache.

The processing circuitry of one embodiment may be further configured to determine a cost ratio of the cost associated with generation of the record and an average cost associated with generation of other records maintained in the cache. In this embodiment, the processing circuitry may be configured to determine whether the record should be deleted based upon the cost ratio. The processing circuitry of this embodiment may be further configured to combine the cost ratio with the representation of the usage of the record to define a score. In this regard, the processing circuitry may be configured to determine whether the record should be deleted by comparing a combination of the cost ratio and the representation of the usage of the record with a predefined threshold. In one embodiment, the processing circuitry may be configured to combine the cost ratio with the representation of the usage of the record by individually weighting the cost ratio and the representation of the usage of the records to define the score. The processing circuitry may be configured to determine the usage of the record in various manners including by determining an average number of retrievals of the record in a predefined time period since a most recent refresh of the record or by determining a representation of time remaining prior to expiration of the record.

In a further embodiment, a computer-readable storage medium is provided that includes instructions that, when executed by a processor, cause the processor to determine a cost associated with generation of a record maintained in a cache, such as in terms of the time consumed to generate the record. At least one of the cost or the usage is determined on a relative basis with respect to the cost or the usage, respectively, of other records maintained in the cache. The instructions, when executed by the processor, also cause the processor to determine usage of the record and to determine whether the record should be deleted from the cache based upon the cost and the usage of the record. In one embodiment, the instructions, when executed by the processor, cause the processor to determine whether the record should be deleted from the cache based upon the cost and the usage of the record, but without consideration of the size of the cache.

The instructions, when executed by the processor, further cause the processor of one embodiment to determine a cost ratio of the cost associated with generation of the record and an average cost associated with generation of other records maintained in the cache. In this embodiment, the determination as to whether the record should be deleted may be based upon the cost ratio. The instructions, when executed by the processor, may also cause the processor of this embodiment to combine the cost ratio with a representation of the usage of the record to define the score. In this embodiment, the determination as to whether the record should be deleted may include a comparison of a combination of the cost ratio and the representation of the usage of the record with a predefined threshold. In regards to the combination of the cost ratio with the representation of the usage of the record, the cost ratio and the representation of the usage of the record may be individually weighted to define the score. The determination of the usage of the record may be determined in various manners including by determining a representation of time remaining prior to expiration of the record.

BRIEF DESCRIPTION OF THE DRAWINGS

Figure 1:
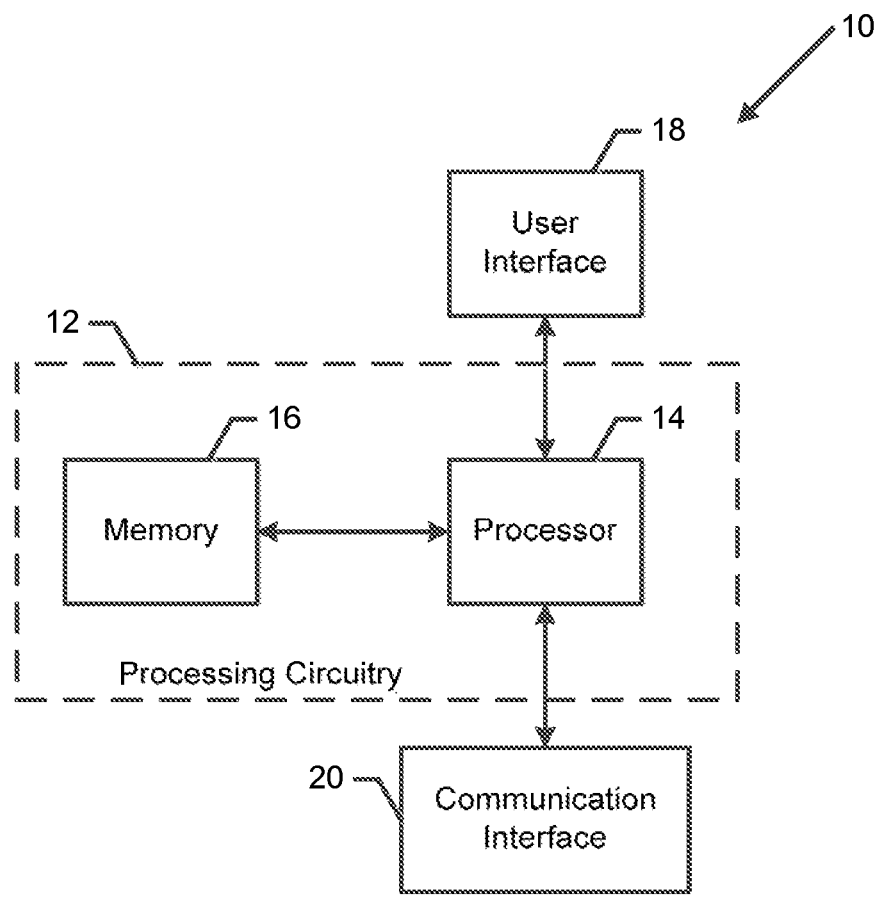
Figure 2:
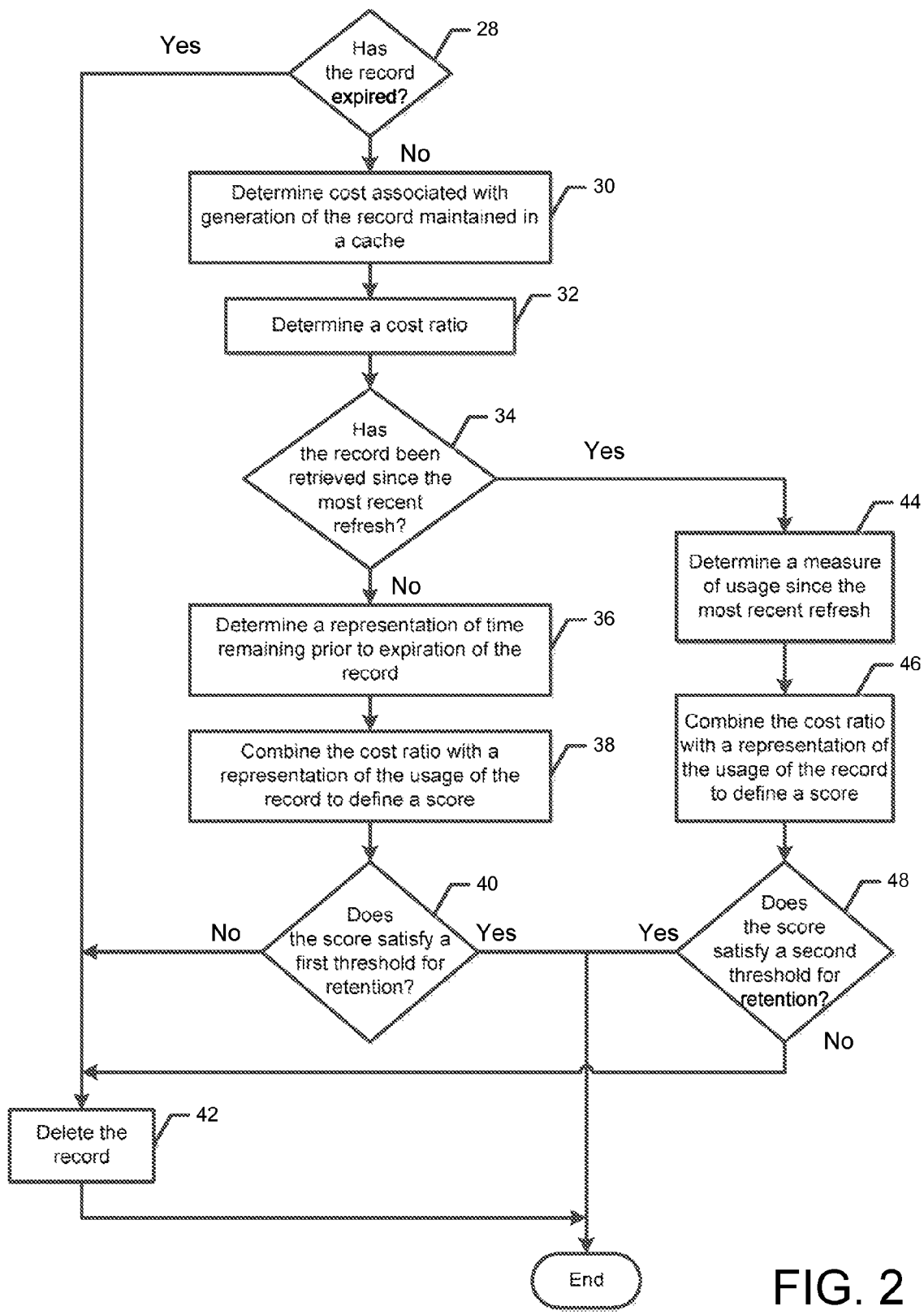

Having thus described certain embodiments of the invention in general terms, reference will now be made to the accompanying drawings, which are not necessarily drawn to scale, and wherein:

FIG. 1 is a block diagram of an apparatus that may be specifically configured in accordance with an example embodiment of the present invention; and FIG. 2 is a flowchart illustrating operations performed, such as by the apparatus of FIG. 1, in accordance with example embodiments of the present invention.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The method, apparatus and computer program product of an example embodiment permit the records maintained by a cache, such as the records of database search results, to be selectively deleted or evicted from the cache. In this regard, the method, apparatus and computer program product of an example embodiment provide for the selective deletion of records from the cache in a manner that both controls the size of the cache so as to maintain the performance provided by the cache, while also taking into account the cost of the records, such as in terms of the time required to generate the records, such that records that have a greater cost are preferentially retained within the cache. By preferentially retaining the records having a greater cost, the method, apparatus and computer program product of an example embodiment conserve the more extensive processing time and processing resources that would otherwise be required to repeat the search of the database in response to the same database query in order to generate the more costly records. Moreover, the method, apparatus and computer program product of an example embodiment may selectively delete records from a cache without requiring the cache to have a predefined size such that the maintenance of the cache and the retention or deletion of the records stored by the cache may be more flexible and adaptable.

The apparatus 10 of one embodiment may be embodied by a computing device, such as a server or the like. The computing device of one embodiment may be capable of functioning in a health information infrastructure, including desktop or laptop computers, mobile devices, tablet computers, servers, or the like. For example, the apparatus may be configured to provide access to medical records via a user portal. In this regard, the apparatus may be implemented on a computing device that may be configured to receive a patient identity, and to access and display records associated with the patient identity via a display. Additionally or alternatively, the apparatus may be configured to provide a health information system operable to receive and process medical record queries as described herein. The apparatus may be configured to function as a search provider to facilitate the processing of medical record queries and, in some embodiments, to derive analytics for the purpose of providing improved search results.

It should be noted that the components, devices or elements illustrated in and described with respect to FIG. 1 below may not be mandatory and thus some may be omitted in certain embodiments. Additionally, some embodiments may include further or different components, devices or elements beyond those illustrated in and described with respect to FIG. 1.

As shown in FIG. 1, the apparatus 10 may include or otherwise be in communication with processing circuitry 12 that is configurable to perform actions in accordance with one or more example embodiments disclosed herein. In this regard, the processing circuitry may be configured to perform and/or control performance of one or more functionalities of the apparatus (e.g., functionalities of a computing device on which the apparatus may be implemented) in accordance with various example embodiments, and thus may provide means for performing functionalities of the apparatus (e.g., functionalities of a computing device on which the apparatus may be implemented) in accordance with various example embodiments. The processing circuitry may be configured to perform data processing, application execution and/or other processing and management services according to one or more example embodiments.

In some example embodiments, the processing circuitry 12 may include a processor 14 and, in some embodiments, such as that illustrated in FIG. 1, may further include memory 16. The processing circuitry may be in communication with or otherwise control a user interface 18 and/or a communication interface 20. As such, the processing circuitry may be embodied as a circuit chip (e.g., an integrated circuit chip) configured (e.g., with hardware, software or a combination of hardware and software) to perform operations described herein.

The processor 14 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In some example embodiments, the processor may be configured to execute instructions stored in the memory 16 or otherwise accessible to the processor. As such, whether configured by hardware or by a combination of hardware and software, the processor may represent an entity (e.g., physically embodied in circuitry—in the form of processing circuitry 12) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform one or more operations described herein.

In some example embodiments, the memory 16 may include one or more non-transitory memory devices such as, for example, volatile and/or non-volatile memory that may be either fixed or removable. In this regard, the memory may comprise a non-transitory computer-readable storage medium. The memory may be configured to store information, data, applications, instructions and/or the like for enabling the apparatus 10 to carry out various functions in accordance with one or more example embodiments. For example, the memory may be configured to store instructions for execution by the processor 14. As yet another alternative, the memory may include one or more databases that may store a variety of files, contents or data sets including, for example, a database cache as described below. Among the contents of the memory, applications may be stored for execution by the processor in order to carry out the functionality associated with each respective application. In some cases, the memory may be in communication with one or more of the processor, user interface 18, or communication interface 20 via a bus or buses for passing information among components of the apparatus.

The user interface 18 may be in communication with the processing circuitry 12 to receive an indication of a user input at the user interface and/or to provide an audible, visual, mechanical or other output to the user. As such, the user interface may include, for example, a keyboard, a mouse, a joystick, a display, a touch screen display, a microphone, a speaker, a Light Emitting Diode (LED), a lighting device, an electronic sensor for capturing human body movements, and/or other input/output mechanisms. In embodiments in which the apparatus 10 is implemented on a server, aspects of the user interface may be limited, or the user interface 116 may even be eliminated. For example, the apparatus may act as a server or host device, with a user interface provided by a client application.

The communication interface 20 may include one or more interface mechanisms for enabling communication with other devices and/or networks, such as for supporting communication with a remote database. In some cases, the communication interface may be any means such as a device or circuitry embodied in either hardware, or a combination of hardware and software that is configured to receive and/or transmit data from/to a network and/or any other device or module in communication with the processing circuitry 12, either wirelessly or via a wireline network.

Having described an apparatus 10 configured to implement and/or support implementation of various example embodiments, features of several example embodiments will now be described. It will be appreciated that the following features are non-limiting examples of features provided by some example embodiments. Further, it will be appreciated that embodiments are contemplated within the scope of disclosure that implement various subsets or combinations of the features further described herein. Accordingly, it will be appreciated that some example embodiments may omit one or more of the following features and/or implement variations of one or more of the following features.

The apparatus 10 may be specifically configured in order to perform a plurality of operations, such as illustrated in FIG. 2 in accordance with an example embodiment of the present invention. As such, the apparatus may be configured to selectively delete records maintained in a cache based upon a combination of the cost of the records and the usage of the records. As described herein by way of an example, the records may be database search results, such as the database search results for a database query submitted to a database of medical records. However, the records may be any of a variety of other types of records with the records relating to medical database search results being provided by way of an example, but not of a limitation.

In order to selectively delete records from the cache, the method, apparatus and computer program product of an example embodiment may evaluate each of the records maintained in the cache or some subset of the records maintained in the cache, such as the oldest records maintained in the cache, the largest records maintained in the cache or some other subset of the records maintained in the cache. For each record, the apparatus 10 of one embodiment, such as the processing circuitry 12, the processor 14 or the like, may determine if the record has expired, as shown in block 28 of FIG. 2. For example, a predetermined period of time designated MaxLastRetrievedDays may be established to define the maximum length of time that a record may remain in the cache without being retrieved. In this example embodiment, the apparatus, such as the processing circuitry, the processor or the like, may determine if the record has expired by comparing the length of time since the last retrieval of the record from the cache to the predetermined period of time. Information relating to the length of time since the last retrieval of the record from the cache may be stored in association with the record, such as within a field of the record. In an instance in which the length of time since the last retrieval of the record is at least as great as the predetermined period of time, the apparatus, such as the processing circuitry, the processor or the like, may delete the record from the cache, as shown in block 42 of FIG. 2. However, in an instance in which the length of time since the last retrieval of the record is less than the predetermined period of time, the apparatus may not automatically delete the record, but may continue to evaluate the record to determine if the record merits deletion for other reasons, even though the record has not expired for a failure to be retrieved for at least the predetermined period of time.

In an instance in which the record has not expired for a failure to be retrieved for at least the predetermined period of time, the apparatus 10, such as the processing circuitry 12, the processor 14 or the like, may then determine the cost associated with the generation of the record, as shown in block 30 of FIG. 2. The cost may be defined in various manners, but, in one embodiment, is defined in terms of the time required to generate the record. In regards to a record that represents database search results, the cost of this embodiment may be defined to be the time required to search the database and to generate the database search results in response to a database query. The cost may be determined in various manners, but, in one embodiment, information relating to the cost may be stored in association with the record, such as within a field of the record. In the embodiment in which the cost is defined in terms of the time required to generate the record, the time required to generate the record may be stored as a field of the record at the time that the record is initially generated and stored within the cache. As such, the apparatus, such as the processing circuitry, the processor or the like, may determine the cost by accessing information associated with the cost stored by the respective record.

In one embodiment, the cost associated with the generation of a record may be converted from an absolute measure of the cost to a relative measure of the cost. The conversion of the cost to a relative measure may facilitate the evaluation of the cost in conjunction with one or more other parameters, such as parameters relating to the usage of the records as described below. As shown in block 32 of FIG. 2, the apparatus 10 of one embodiment, such as the processing circuitry 12, the processor 14 or the like, may be configured to determine the cost ratio as a ratio of the cost associated with generation of the record to an average cost associated with the generation of other records maintained in the cache. In this regard, the average cost may be the average cost associated with the generation of all other records maintained in the cache or the average cost associated with the generation of a subset of the records maintained in the cache, such as other records having similar characteristics, having a similar size, being of a similar age or the like.

The apparatus 10, such as the processing circuitry 12, the processor 14 or the like, may also be configured to determine usage of the record. In this regard, the usage of the record may be determined in a variety of manners including a determination as shown in block 34 of FIG. 2 as to whether the record has been retrieved since the most recent refresh, e.g., updating, of the record. In one embodiment, information regarding the usage of the record may be maintained by or in association with the record so as to be accessible to the apparatus. The apparatus, such as the processing circuitry, the processor or the like, may then determine whether the record should be deleted from the cache based upon the cost and the usage of the record. As shown in FIG. 2, the analysis may differ in one embodiment depending upon whether the record has been retrieved since the most recent refresh of the record. However, in other embodiments, the apparatus, such as the processing circuitry, the processor or the like, may be configured to determine whether the record should be deleted from the cache in the same manner based upon the cost and the usage of the record regardless of whether the record has been retrieved since the most recent refresh of the record. For purposes of example, but not of limitation, the operations depicted in FIG. 2 in which the analysis as to whether the record should be deleted differs depending upon whether the record has been retrieved since the most recent refresh of the record will be hereinafter described.

In an instance in which the record has not been retrieved since the most recent refresh, the record may be considered to have not recently been used. In this instance, the apparatus 10, such as the processing circuitry 12, the processor 14 or the like, may be configured to determine a representation of the time remaining prior to expiration of the record. See block 36 of FIG. 2. Various representations of the time remaining prior to expiration of the record may be determined, but, in one embodiment, the apparatus, such as the processing circuitry, the processor or the like, may determine the percentage of time remaining prior to the expiration of the record. In this regard, the percentage of time remaining may be defined as a ratio of the time remaining prior to expiration of the record to the total time initially allotted to a record prior to its expiration. In one embodiment, information regarding the time remaining prior to expiration of each record and the total time initially allotted to each record may be maintained by or in association with the respective records so as to be accessible to the apparatus. By way of example, the apparatus, such as the processing circuitry, the processor or the like, may determine the representation of the time remaining prior to expiration of the record to equal 1−(DaysSinceRetrieved/MaxLastRetrievedDays) wherein DaysSinceRetrieved is the number of days since the record has been retrieved and MaxLastRetrievedDays is the maximum number of days that a record may exist without being retrieved, thereby defining the percentage of time remaining prior to the expiration of the record.

In order to determine a relative measure of the time remaining as opposed to an absolute measure of the time remaining prior to expiration of a record, the apparatus of one embodiment, such as the processing circuitry, the processor or the like, may be configured to determine a ratio of the percentage of time remaining prior to expiration of the record to an average of the percentage of time remaining prior to expiration for a plurality of records maintained by the cache, such as all records maintained by the cache or a subset of the records maintained by the cache as described above. In this embodiment, the resulting ratio may be a representation of the usage of the record in that it provides a relative measure of the time remaining in which the record may be utilized.

As described above, the determination as to whether the record should be deleted from the cache may be based upon the cost and the usage of the record. As such, the apparatus 10 of one embodiment, such as the processing circuitry 12, the processor 14 or the like, may be configured to combine the cost ratio with the representation of the usage of the record to define a score. See block 38 of FIG. 2. In combining the cost ratio with the representation of the usage of the record in accordance with one embodiment, the cost ratio and the representation of the usage of the record may be individually weighted, such that the relative impact of the cost ratio and the representation of the usage of the record may be appropriately tailored. For example, the cost ratio may be more greatly weighted than the representation of the usage of the record in an instance in which the cost associated with the generation of the record is considered of more import than the usage of the record in regards to the determination as to whether the record should be retained or deleted from the cache. Conversely, the representation of the usage of the record may be more greatly weighted than the cost ratio in an instance in which the usage of the record is considered of more import than the cost associated with the generation of the record in regards to the determination as to whether the record should be retained or deleted from the cache. Moreover, the determination of the cost ratio and the representation of the usage of the record on a relative basis facilitates the combination of the cost ratio and the representation of the usage of the record by placing the cost ratio and the representation of the usage of the record on a comparable scale, such as by having comparable magnitudes centered about the same value, such as 1; at least prior to the weighting of the cost ratio and the representation of the usage of the record.

The cost ratio and the representation of the usage of the record may be combined in various manners. In one embodiment, however, the apparatus 10, such as the processing circuitry 12, the processor 14 or the like, may be configured to combine the cost ratio with the representation of the usage of the record to define a score pursuant to Equation (1) set forth below:

$$Score=((r1*m1)+(r2*m2))/(m1+m2)$$

wherein r1 is the cost ratio, m1 is the weighting factor associated with the cost ratio, r2 is the representation of the usage of the record and m2 is the weighting factor for the usage of the record. In one embodiment, the weighting factors may be predefined and may be stored by the memory 16 so as to be accessible to the processor 14.

The score that results from the combination of the cost ratio and the representation of the usage of the record may then be compared to a first threshold to determine whether the record should be deleted. As shown in block 40 of FIG. 2, for example, the apparatus 10 of one embodiment, such as the processing circuitry 12, the processor 14 or the like, may be configured to compare the score defined by the combination of the cost ratio and the representation of the usage of the record to a first threshold. In an instance in which the score satisfies the first threshold, such as by equaling or exceeding the first threshold, the record may be maintained in cache. However, in an instance in which the score does not satisfy the first threshold, such as by being less than the first threshold, the apparatus, such as the processing circuitry, the processor or the like, may delete the record from the cache, thereby reducing the size of the cache and facilitating the performance of the cache. See block 42 of FIG. 2. By having deleted the record only after having considered the cost associated with the generation of the record and the usage of the record, the method, apparatus and computer program product of an example embodiment may controllably retain or delete records from the cache with a preference for the retention of records that have a greater cost in terms of their generation and/or that have been used more frequently in comparison to records that have a lower cost associated with their generation and/or that have been used less frequently.

In regards to the embodiment depicted in FIG. 2, in an instance in which the record is determined to have been retrieved since the most recent refresh of the record such that the record is considered to be a more recently utilized record, the apparatus 10, such as the processing circuitry 12, the processor 14 or the like, may be configured to determine a measure of usage since the most recent refresh of the record. See block 44 of FIG. 2. Although the measure of usage since the most recent refresh of the database may be determined in various manners, the apparatus of one embodiment, such as the processing circuitry, the processor or the like, may be configured to determine an average number of retrievals of the record in a predefined time period, such as the average number of retrievals per day, since the most recent refresh of the record. In one embodiment, information regarding the number of retrievals in the predefined time period for each record may be maintained by or in association with the respective records so as to be accessible to the apparatus.

As described above in conjunction with other parameters, the measure of usage since the most recent refresh may be expressed not only in terms of an absolute measure, but also in terms of a relative measure. As such, the apparatus 10, such as a processing circuitry 12, the processor 14 or the like, may determine a relative measure of the usage since the most recent refresh by determining the ratio of the average number of retrievals of the record in a predefined time period since the most recent refresh to the average number of retrievals of each of a plurality of records, such as all records in the cache or some subset of the records in the cache, in the same predefined time period since the most recent refresh. The resulting ratio represents a relative measure of the usage since the most recent refresh and, as described above in conjunction with other parameters, may facilitate a combination of the ratio with other parameters, such as the cost ratio by scaling the relative measure of the usage since the most recent refresh in a comparable manner to the cost ratio, such as by scaling both parameters so as to have comparable magnitudes centered about the same predefined value, such as 1. In this embodiment, the relative measure of usage since the most recent refresh, such as the ratio relating to the average number of retrievals of the record in a predefined time period to the average number of retrievals of each of a plurality records in the same predefined time period may be considered a representation of the usage of the record.

As such, the apparatus 10, such as a processing circuitry 12, the processor 14 or the like, may be configured to combine the cost ratio and the representation of the usage of the record to define a score. See block 46 of FIG. 2. In regards to the combination of the cost ratio with the representation of the usage of the record, the cost ratio and the representation of the usage of the record may, in one embodiment, be individually weighted in order to appropriately tailor the score depending upon the relative importance of the cost ratio and the representation of the usage of the record, as described above. The cost ratio and the representation of the usage of the record may be combined in various manners. In one embodiment, however, the apparatus, such as the processing circuitry, the processor or the like, may be configured to combine the cost ratio with the representation of the usage of the record to define a score in accordance with Equation (1) as set forth above.

The score that results from the combination of the cost ratio and the representation of the usage of the record may then be compared to a second threshold to determine whether the record should be deleted. As shown in block 48 of FIG. 2, for example, the apparatus 10 of one embodiment, such as the processing circuitry 12, the processor 14 or the like, may be configured to compare the score defined by the combination of the cost ratio and the representation of the usage of the record to a second threshold. In an instance in which the score satisfies the second threshold, such as by equaling or exceeding the second threshold, the record may be maintained in cache. However, in an instance in which the score does not satisfy the second threshold, such as by being less than the second threshold, the apparatus, such as the processing circuitry, the processor or the like, may delete the record from the cache, thereby reducing the size of the cache and facilitating the performance of the cache. See block 42 of FIG. 2. As described above, the method, apparatus and computer program product of an example embodiment may therefore selectively retain or delete records from the cache with a preference for the retention of records that have a greater cost in terms of their generation and/or that have been used more frequently.

The second threshold may be different than the first threshold. For example, the first and thresholds may be set to different values in an instance in which there is to be a difference in the manner in which the records are retained or deleted depending upon whether or not the records have been recently used, such as by having been retrieved since the most recent refresh. In this regard, the first threshold may be greater than the second threshold in one embodiment such that a greater percentage of the records that are used less frequently, such as by not having been retrieved since the most recent refresh, are deleted relative to the more recently used records.

As described, the method, apparatus and computer program product are therefore configured to selectively delete records from the cache in a manner that takes into account usage of the record as well as the cost associated with the generation of the record. As such, the method, apparatus and computer program product of an example embodiment may preferentially retain records having a greater cost associated with their generation in comparison to other records having a smaller cost associated with their generation. Thus, the method, apparatus and computer program product of an example embodiment may avoid incurring those greater costs in conjunction with the subsequent generation of a response to the same database query.

With respect to the selective deletion of records from the cache based upon the usage of the records, records that are no longer in use or are outdated may be selectively deleted. For example, records that were generated in response to database queries for which the definition has since changed may be deleted and/or records that were generated in response to periodic database queries that have expired may be deleted. Additionally, the method, apparatus and computer program product of an example embodiment may delete records associated with random database queries that are only posed a limited number of times, such as 1 or 2, times. However, the method, apparatus and computer program product of an example embodiment may retain records that are more costly, such as in terms of the time required to generate the records, even in instances in which the records are retrieved less frequently than other records. By balancing the concerns relating to the cost associated with the generation of a record and the usage of a record, the size of the cache may be proactively managed so as to maintain the desirable performance characteristics of the cache, even in an instance in which the cache does not have a predefined size to govern the number or size of records stored therein.

It will be understood that each block of the flowchart of FIG. 2, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory 16 of an apparatus 10 employing an embodiment of the present invention and executed by a processor 14 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified or, alternatively, may be eliminated. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. For example, the method, apparatus and computer program product of one embodiment may determine the usage of the records since the most recent import of a subset of records. As such, the method, apparatus and computer program product of one embodiment may initially determine if the time that has elapsed since the most recent import is at least a predefined minimum time period and, if so, may then proceed to determine if any of the records merit deletion as shown in operations 30-48 of FIG. 2 and as described above. However, in instances in which the time that has elapsed since the most recent import is less than the predefined minimum time period, the method, apparatus and computer program product of an example embodiment may determine that the import occurred too recently to meaningfully analyze the records for deletion and, as such, operations 30-48 of FIG. 2 may be deferred at least until the time that has elapsed since the most recent import equals or exceeds the predefined minimum time period. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
   determining a cost associated with initial generation of a record that is then maintained in a cache by determining the cost in terms of time consumed to initially generate the record with the time consumed to initially generate the record being based upon time required to generate search results from a search of a database in response to a database query with the search results then stored in the cache;
   determining usage of the record including retrieval of the record with the usage occurring following storage of the record in the cache, wherein at least one of the cost or the usage is determined on a relative basis with respect to the cost or the usage, respectively, of other records maintained in the cache;
   combining a representation of the cost with a representation of the usage of the record to define a score; and
   determining, with a processor, whether the record is to be deleted from the cache based upon the cost and the usage of the record, wherein determining whether the record is to be deleted comprises comparing the score based upon a combination of the representation of the cost and the representation of the usage of the record to a predefined threshold.

2. A method according to claim 1 further comprising determining a cost ratio of the cost associated with generation of the record and an average cost associated with generation of other records maintained in the cache, and wherein determining whether the record is to be deleted comprises determining whether the record is to be deleted from the cache based upon the cost ratio.

3. A method according to claim 2 wherein the representation of the cost comprises the cost ratio.

4. A method according to claim 3 wherein combining the cost ratio with the representation of the usage of the record comprises individually weighting the cost ratio and the representation of the usage of the record to define the score.

5. A method according to claim 1 wherein determining usage of the record comprises determining an average number of retrievals of the record in a predefined time period since a most recent refresh of the record.

6. A method according to claim 1 wherein determining usage of the record comprises determining a representation of time remaining prior to expiration of the record.

7. A method according to claim 1 wherein determining whether the record is to be deleted from the cache based upon the cost and the usage of the record comprises determining whether the record is to be deleted from the cache without consideration of a size of the cache.

8. A method according to claim 1 wherein determining usage of the record comprises determining usage of the record based on a number of retrievals of the record following storage in the cache.

9. An apparatus comprising a hardware processing circuitry configured to:
   determine a cost associated with initial generation of a record that is then maintained in a cache by determining the cost in terms of time consumed to initially generate the record with the time consumed to initially generate the record being based upon time required to generate search results from a search of a database in response to a database query with the search results then stored in the cache;
   determine usage of the record including retrieval of the record with the usage occurring following storage of the record in the cache;
   combine a representation of the cost with a representation of the usage of the record to define a score; and
   determine whether the record is to be deleted from the cache based upon the cost and the usage of the record, wherein the processing circuitry is configured to determine at least one of the cost or the usage on a relative basis with respect to the cost or the usage, respectively, of other records maintained in the cache, wherein the hardware processing circuitry is configured to determine whether the record is to be deleted by comparing the score based upon a combination of the representation of the cost and the representation of the usage of the record to a predefined threshold.

10. An apparatus according to claim 9 wherein the processing circuitry is further configured to determine a cost ratio of the cost associated with generation of the record and an average cost associated with generation of other records maintained in the cache, and wherein the processing circuitry is configured to determine whether the record is to be deleted by determining whether the record is to be deleted from the cache based upon the cost ratio.

11. An apparatus according to claim 10 wherein the representation of the cost comprises the cost ratio.

12. An apparatus according to claim 11 wherein the processing circuitry is configured to combine the cost ratio with the representation of the usage of the record by individually weighting the cost ratio and the representation of the usage of the record to define the score.

13. An apparatus according to claim 9 wherein the processing circuitry is configured to determine usage of the record by determining an average number of retrievals of the record in a predefined time period since a most recent refresh of the record.

14. An apparatus according to claim 9 wherein the processing circuitry is configured to determine usage of the record by determining a representation of time remaining prior to expiration of the record.

15. An apparatus according to claim 9 wherein the processing circuitry is configured to determine whether the record is to be deleted from the cache based upon the cost and the usage of the record without consideration of a size of the cache.

16. An apparatus according to claim 9 wherein the processing circuitry is configured to determine usage of the record by determining usage of the record based on a number of retrievals of the record following storage in the cache.

17. A non-transitory computer readable storage medium comprising instructions that, when executed by a processor, cause the processor to:
   determine a cost associated with initial generation of a record that is then maintained in a cache by determining the cost in terms of time consumed to initially generate the record with the time consumed to initially generate the record being based upon time required to generate search results from a search of a database in response to a database query with the search results then stored in the cache;

determine usage of the record including retrieval of the record with the usage occurring following storage of the record in the cache, wherein at least one of the cost or the usage is determined on a relative basis with respect to the cost or the usage, respectively, of other records maintained in the cache;

combine a representation of the cost with a representation of the usage of the record to define a score; and determine whether the record is to be deleted from the cache based upon the cost and the usage of the record, wherein the processor is caused to determine whether the record is to be deleted by comparing the score based upon a combination of the representation of the cost and the representation of the usage of the record to a predefined threshold.

18. A non-transitory computer readable storage medium according to claim 17 wherein the instructions, when executed by the processor, further cause the processor to determine a cost ratio of the cost associated with generation of the record and an average cost associated with generation of other records maintained in the cache, and wherein determining whether the record is to be deleted comprises determining whether the record is to be deleted from the cache based upon the cost ratio.

19. A non-transitory computer readable storage medium according to claim 18 wherein the representation of the cost comprises the cost ratio.

20. A non-transitory computer readable storage medium according to claim 17 wherein determining whether the record is to be deleted from the cache based upon the cost and the usage of the record comprises determining whether the record is to be deleted from the cache without consideration of a size of the cache.

21. A non-transitory computer readable storage medium according to claim 17 wherein determining usage of the record comprises determining usage of the record based on a number of retrievals of the record following storage in the cache.

* * * * *